(12) United States Patent
Hua

(10) Patent No.: US 7,889,775 B2
(45) Date of Patent: Feb. 15, 2011

(54) PARTICLE DAMAGE PROTECTION FOR HIGH POWER $CO_2$ SLAB LASER MIRRORS

(75) Inventor: Gongxue Hua, Unionville, CT (US)

(73) Assignee: Coherent, Inc., Santa Clara, CA (US)

( * ) Notice: Subject to any disclaimer, the term of this patent is extended or adjusted under 35 U.S.C. 154(b) by 60 days.

(21) Appl. No.: 12/487,730

(22) Filed: Jun. 19, 2009

(65) Prior Publication Data
US 2010/0172386 A1 Jul. 8, 2010

Related U.S. Application Data

(60) Provisional application No. 61/142,981, filed on Jan. 7, 2009.

(51) Int. Cl.
*H01S 3/22* (2006.01)
(52) U.S. Cl. ............... 372/55; 372/57; 372/58; 372/61; 372/87; 372/92
(58) Field of Classification Search .............. 372/55, 372/57–58, 61, 87
See application file for complete search history.

(56) References Cited

U.S. PATENT DOCUMENTS

| | | | |
|---|---|---|---|
| 5,216,689 A | 6/1993 | Gardner et al. | |
| 7,263,116 B2 | 8/2007 | Shackleton et al. | |
| 2005/0018736 A1* | 1/2005 | Kennedy et al. | ............... 372/55 |
| 2008/0240183 A1* | 10/2008 | Newman et al. | ............... 372/35 |
| 2009/0034574 A1* | 2/2009 | Shackleton et al. | ........... 372/61 |
| 2009/0034577 A1 | 2/2009 | Newman et al. | |

FOREIGN PATENT DOCUMENTS

WO 2005/078877 A1 8/2005

OTHER PUBLICATIONS

International Search Report and Written Opinion received for PCT Patent Application No. PCT/US2009/069176, mailed on Jul. 5, 2010, 15 pages.

* cited by examiner

*Primary Examiner*—Dung T Nguyen
(74) *Attorney, Agent, or Firm*—Morrison & Foerster LLP

(57) ABSTRACT

A $CO_2$ gas discharge laser includes elongated planar live and ground electrodes vertically spaced and electrically insulated from each. The electrodes are spaced apart by ceramic spacer strips arranged along the edges of the electrodes. An auxiliary electrode is located at each end of the live electrode, co-planar with the live electrode, longitudinally spaced part from the live electrode vertically spaced apart from, but electrically connected to, the ground electrode. The auxiliary electrode has two raised portions spaced apart by a distance less than the distance between inside edges of the ceramic strips. The raised portions of the auxiliary electrode prevent erosion of the ceramic strips by laser radiation generated in the resonator when the laser is operating.

14 Claims, 2 Drawing Sheets

PARTICLE DAMAGE PROTECTION FOR HIGH POWER $CO_2$ SLAB LASER MIRRORS

PRIORITY

This application claims priority to U.S. Provisional Patent Application Ser. No. 61/142,981 filed Jan. 7, 2009.

TECHNICAL FIELD OF THE INVENTION

The present invention relates in general to high-power $CO_2$ (gas discharge) slab-lasers. The invention relates in particular to protecting resonator mirrors of such a laser from damage by particles generated during operation of the laser.

DISCUSSION OF BACKGROUND ART

A $CO_2$ gas slab laser has two spaced-apart parallel rectangular electrodes separated by a relatively small distance. The electrodes are located in a housing containing a lasing gas mixture including carbon dioxide ($CO_2$) and inert gases such as nitrogen ($N_2$), helium (He) and xenon (Xe). Radio frequency (RF) power is applied to the electrodes and creates a gas discharge in the lasing gas mixture in the space (discharge region) between the electrodes. Ionized gas in the discharge region provides a gain medium of the laser.

The optimum distance separating the electrodes is dependent on the pressure of the lasing gas mixture, the composition of the mixture, the wavelength of the laser and the RF frequency (radio frequency). Typical electrode separation distances are between about 1.4 millimeters (mm) and 2.1 mm for RF power frequencies between about 80 megahertz) MHz and 100 MHz, and for gas mixture pressures between about 50 and 120 Torr. The output power of $CO_2$ slab lasers scales with the area of the discharge between the electrodes. Output is usually repetitively pulsed output.

A $CO_2$ slab lasers normally has two rectangular concave mirrors arranged to form a negative branch unstable resonator. One mirror is placed near each end of the two rectangular electrodes with one mirror (the output coupling mirror) being shorter than other (the return mirror). The negative branch unstable resonator has hybrid mode of oscillation. One mode is a guided wave mode that is guided down the length of the electrodes between opposite facing surfaces thereof. The other mode component is a free-space mode, formed by the mirrors, which zigzags between the mirrors through the discharge region until the radiation exits the resonator by bypassing the output coupling mirror. The difference in length of the mirrors determines the amount of output coupling. An output coupling of 12 to 15% is typical.

The resonator mirrors are typically made from gold plated copper (Cu). Reflecting surfaces are thin film coated for high reflectivity at the $CO_2$ laser wavelength, which is usually 10.6 micrometers (μm), 10.3 μm, 9.6 μm, or 9.3 μm. The metal mirrors are normally mounted on aluminum end flanges of the laser housing which also serves as RF electrical ground. This mirror mounting arrangement places the metal mirrors at ground potential. One of the electrodes is the live or "hot" electrode and is insulated from the housing. The other electrode is the ground electrode and is grounded to the housing.

The mirrors should be located far enough away from the hot electrode to avoid any of the following possibilities: a discharge forming between the hot electrode and the mirrors; attracting energized ion species, generated in the discharge, to the mirror; or overexposing the mirrors to intense UV radiation which is generated within the discharge. All three possibilities can damage the mirrors, thereby causing reduced laser performance from the standpoint of output power, beam quality, and lifetime.

Typically the electrodes are separated and maintained parallel to each other by ceramic-strip spacers placed along the edges and down the length of the electrodes. When properly arranged, the ceramic spacers between the electrodes also provide beam pointing stability improvements. A problem with such spacers is that if laser power is sufficiently high, for example, about 3000 Watts (W) peak and 1000 Hz pulse repetition frequency (PRF) the ends of the ceramic spacers can be ablated by stray laser radiation, generating ceramic particles which can be deposited on the mirrors. Such deposits cause sites for further laser radiation damage.

Methods of protecting resonator mirrors from damage by oxidizing species generated in the discharge are described in U.S. Pat. No. 5,216,689, the disclosure of which is incorporated herein by reference. Here a recombination surface is formed by extending the length of the hot electrode by means of a dielectric addition thereto, with the hot electrode and dielectric extension being equal to the length of the ground electrode. Adding this dielectric extension extends the waveguide region between the metal electrodes. The discharge stops where the hot metal electrode ends. Consequently, the extended waveguide region has no gain. The '689 patent also discloses a shield having an aperture therein to pass the lasing modes.

The methods described in the '689 patent successfully address the problem of damage to the laser mirrors by the oxidizing species but do not address the problem of damage from particulates ablated from the ceramic spacers, as laser power was not high enough for such ablation to occur. The ablation problem needs to be addressed to provide reliable high-power $CO_2$ slab lasers with commercially acceptable lifetime.

SUMMARY OF THE INVENTION

In one aspect a RF power driven gas discharge laser comprises first and second elongated planar discharge-electrodes arranged vertically spaced apart and parallel to each other. The electrodes are electrically insulated from each other with the first electrode functioning as a live electrode and arranged to receive the RF power from a source thereof and the second electrode functioning as a ground electrode. The discharge electrodes are spaced apart by first and second electrically insulating spacer strips having first and second opposite ends and arranged along opposite edges of the electrodes with inside edges thereof laterally spaced-apart by a first distance. The spacer strips have a height which determines the vertical spacing of the live and ground electrodes. First and second mirrors form a laser resonator extending longitudinally through the space between the discharge electrodes, such that when a discharge is created in a lasing gas between the discharge electrodes when the first electrode receives the RF power, laser radiation circulates in the laser resonator. A planar auxiliary electrode is located at each end of the first electrode, longitudinally spaced apart from the first electrode, vertically spaced apart from the ground electrode and electrically connected to the second electrode. The auxiliary electrode has two raised portions thereon having a height about equal to the height of the spacer strips and laterally spaced apart by a second distance less than the first distance. The raised portions of the auxiliary electrodes minimize erosion of the insulating spacer strips by the laser radiation.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
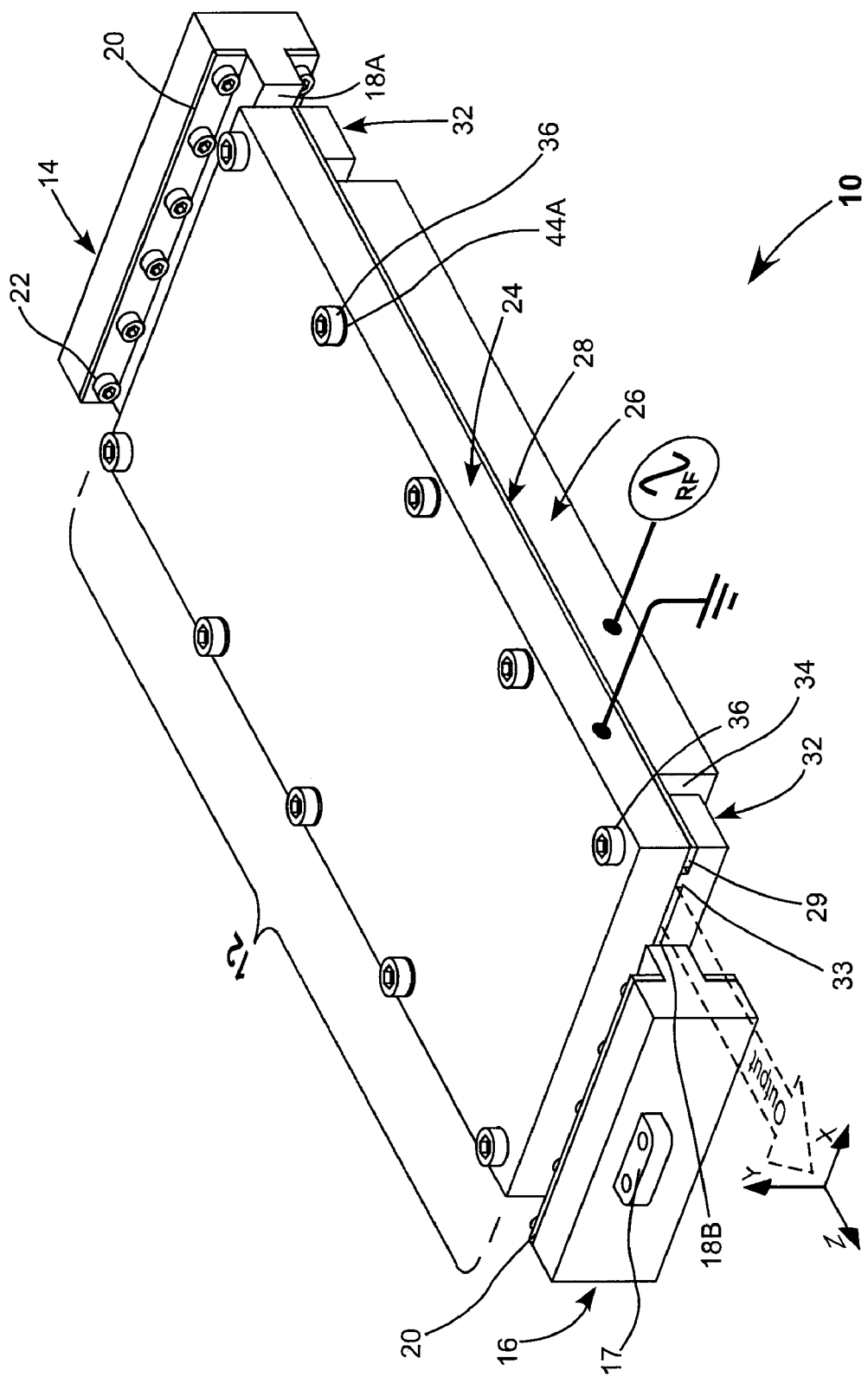
FIG. 1 is an isometric view schematically illustrating a CO2 slab laser including a preferred embodiment of a discharge-electrode arrangement in accordance with the present invention.

Referring now to the drawings, wherein like components are designated by like reference numerals, FIG. 1 schematically illustrates a $CO_2$ slab-laser 10 including a discharge-electrode assembly 12 in accordance with the present invention. Cartesian axes X, Y, and Z are depicted, with Z being the propagation-axis of the resonator, and X and Y being the free-space and waveguide-axes respectively. Laser 10 includes a negative-branch unstable resonator formed in one axis (the X-axis) by mirror assemblies 14 and 16 having concave reflecting surfaces 18A and 18B, respectively. Reflective surface 18A provides the turning mirror surface of the unstable resonator. Reflective surface 18B is shorter in the X-axis to allow output radiation to be coupled out of the resonator as indicated.

In this example, the mirror-assemblies include an elongated mirror body having a T-shaped cross-section with the reflective surfaces being formed on the base of the stem of the "T". Attached to the underside of the head of the "T", by screws 22, are strips 20 of a metal different to that of the body. The mirror body is preferably of gold-plated copper, with strips 20 being of stainless steel. The purpose of this bimetallic arrangement is to minimize curvature changes of the reflecting surface as the mirrors become heated during operation of the laser. Such mirror assemblies are usually mounted on end-flanges of a laser housing (not shown) which encloses the mirror assemblies and the electrodes and contains the lasing gas mixture. In FIG. 1 mirror 16 has a bracket 17 machined as part of the head of the T portion of the mirror for mounting on such an end-flange. A similar bracket (not visible) is provided on mirror assembly 14. (See commonly owned U.S. Patent Publication No. 2009/0034577, the disclosure of which is incorporated herein by reference.)

Electrode assembly 12 includes parallel elongated rectangular discharge-electrodes 24 and 26 spaced apart by ceramic strips 28 (only one visible in FIG. 1) aligned along the edges of the electrodes. Electrode 26 is the live or electrically "hot" electrode to which RF power is supplied. Electrode 24 is the ground electrode. Electrode 24 is longer than electrode 26 and extends past electrode 26 at each end thereof. There is a metal extension block or auxiliary electrode 32 adjacent to each end of "hot" discharge-electrode 26 but electrically isolated from electrode 26 by a gap 34 and an extension 29 of ceramic spacer 28. The discharge-electrodes and ceramic spacers are bolted together by bolts 36. Extension block 32, spacer-extension 29 and ground discharge-electrode 26 are also bolted together, which, together with raised portion 33 of the extension block, electrically connects the extension block to the ground discharge electrode and, accordingly, to ground. The inventive physical and electrical arrangement of this extension block or auxiliary electrode provide the desired protection of the ceramic spacers from ablation by stray intercavity laser radiation and consequently protect the reflective surfaces of the mirror assemblies from particulate damage. This arrangement is described in detail further hereinbelow.

It should be noted, here, that mirror assemblies 14 and 16 are just one example of mirror assemblies that can be used with electrode-arrangement 12. These particular assemblies merely serve, here, to show the relationship of the reflective surfaces of the negative unstable resonator with the electrode assembly. Any other mirror assembly may be used, with reflective surfaces having the same or some other curvature, without departing from the spirit and scope of the present invention. The discharge electrodes as depicted are somewhat shorter than would be the case in a practical example, for convenience of illustration. Exemplary dimensions are provided in the following description.

Figure 2:
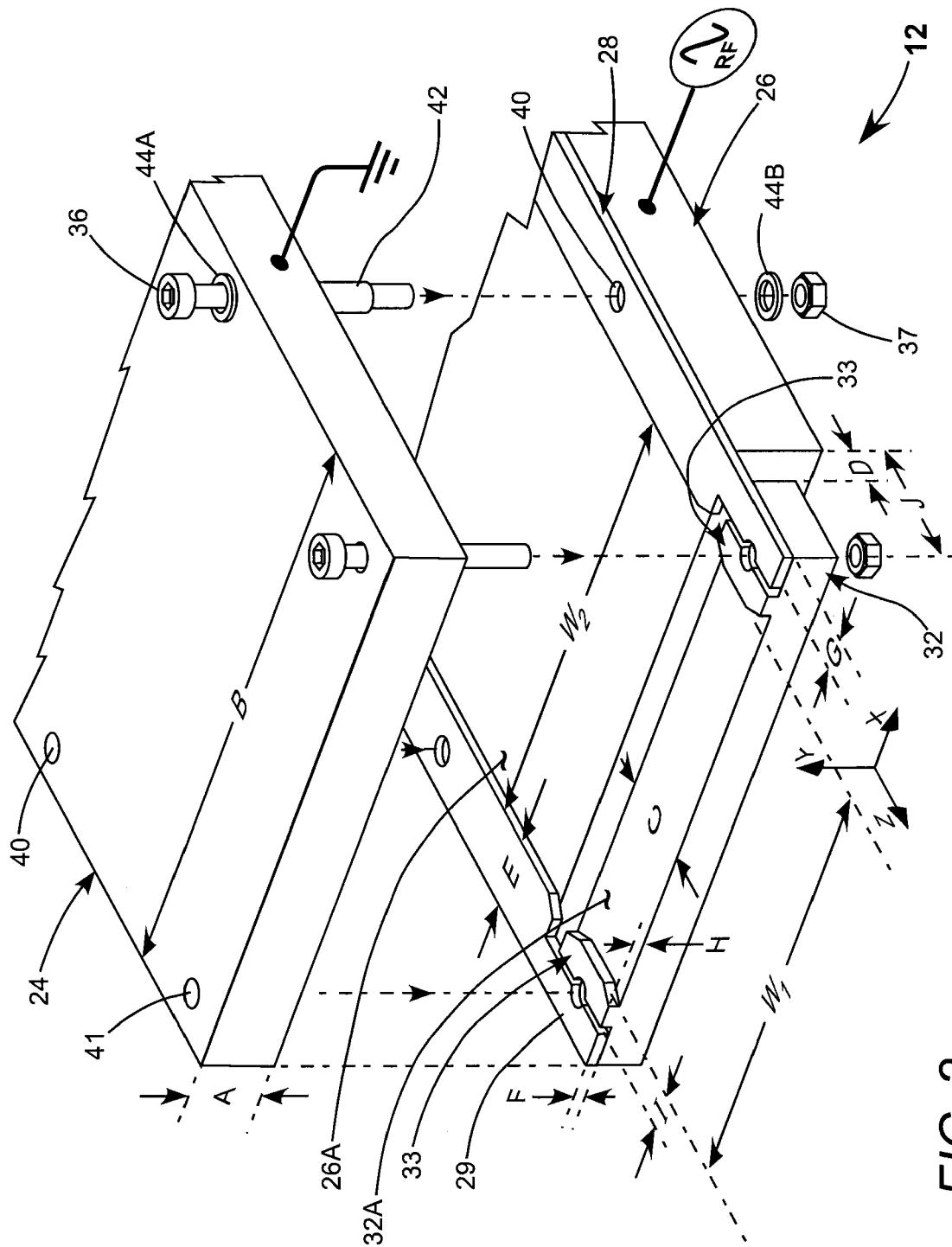
FIG. 2 is a fragmentary, partially dismantled, isometric view schematically illustrating details of the electrode assembly of FIG. 1.

FIG. 2 is a fragmentary, partially dismantled, isometric view schematically illustrating details and important dimensions of electrode assembly 12. Only one end of the electrode-assembly is depicted. It is intended that the other end be similarly configured. In the following description mention is made of the length, width, and thickness of certain members. These terms refer to dimensions taken in the Z-axis, X-axis, and Y-axis directions respectively.

Auxiliary electrode 32 has a length C and is spaced in the Z-axis or length direction by a distance D from the end of "hot" electrode 26. Ground discharge-electrode 24 has a thickness A, a width B and a length that is longer than the length of "hot" discharge electrode 26 by an amount 2 times J, where J equals C plus D. The discharge electrodes extension blocks are arranged symmetrically one below the other such that the ends of the ground discharge electrodes and the extension blocks are co-planar in the X-Y plane.

Ceramic strips 28 have a maximum width E between the discharge electrodes and a thickness F. The separation between the opposite facing inside edges of the ceramic spacer strips is $W_2$. Extensions 29 of the ceramic spacer strips have reduced widths G that are about one-half of the width E. Raised portions (plateaus) 33 of extension block 32 have a height H that is preferably slightly less than the thickness F of ceramic spacers 28. This provides that the spacers determine the vertical separation of the live and ground electrodes which ensures that electrode surface 26A of the live electrode and electrode surface 32A of the auxiliary electrode are coplanar. Preferably also the inside front edges of the raised portions of the extension block are chamfered, i.e., machined at an angle, (as depicted in FIG. 2) to deflect any intra-cavity laser radiation that may irradiate these ends away from the mirror therefore avoiding spurious feedback into the resonator which would cause stray resonances. An angle of approximately 45 degrees is usually suitable for this purpose.

The width I of raised portions 33 of extension block 32 is slightly less than one-half of the maximum width E of the ceramic spacers. This is for ease of assembly. The separation $W_1$ between the inside opposite-facing edges of raised portions 33 of the extension block is slightly smaller than $W_2$ This prevents stray intra-cavity laser radiation from seeing the ends of the dielectric spacer strips, thereby preventing ablation of the ends of the dielectric strips.

The thickness A of the electrodes is selected to provide adequate stiffness for the width B and length of the electrodes. The thickness A is also selected to be large enough to accommodate coolant-fluid channels within the electrodes. The coolant-fluid channels are not shown in the drawing for simplicity of illustration. By way of example, in a slab laser having a pulsed output of 3 kW peak power at a PRF of power 1 kHz, and having coolant-fluid channels in the electrodes, A would be about 2.6 cm. This laser example will be used throughout the remaining description to provide exemplary dimensions of the inventive electrode arrangement. The width B and length of the electrodes are determined by the average power from the slab laser since the power output scales with the discharge area for a $CO_2$ slab laser. For the instant example, width B and the electrode length are preferably about 0.1 meter (m) and 0.6 m respectively.

Thickness F of ceramic spacer strips 28 establishes the electrode separation as noted above. The optimum value of the electrode separation is determined by the desired output wavelength, RF frequency, gas pressure and composition. In the instant example, F is preferably about 1.5 mm. The width E of the ceramic spacer strips is preferably about 1.4 cm. In order to reduce the possibility of breakage, each of the ceramic spacer-strips is preferably formed from three sections rather than a single strip. Open spaces are preferably maintained between the individual ceramic spacer sections to serve as pressure release ports for acoustic shocks generated by the pulsating discharge, as is known in the art to which the present invention pertains. Separate sections are not depicted in FIG. 1 for simplicity of illustration and secription. The height H of the raised portions 33 of extension block 32 is approximately 0.15 mm for the instant example. F is preferably 0.16 mm. Width I is preferably 1.19 mm.

Extension block 32 is separated from the hot RF electrode by a distance D. Separation D must be sufficiently large that no gas discharge can occur between the extension block (at ground potential) and "hot" discharge-electrode 26. In the instant example, D is preferably about 6.4 mm. The thickness of the extension block is of little importance except for structural rigidity. For the instant example, a thickness of approximately 8.4 mm is adequate.

Bolt holes 40, preferably two for each section of ceramic spacers 28, are provided along the edges of the length of the electrodes and through the ceramic spacers to bolt together the electrodes/ceramic spacer assembly. A dielectric cylindrical tube 42 is first inserted through a dielectric washer 44A placed on the top surface of ground discharge-electrode 24 and through a dielectric washer 44B on the bottom surface of "hot" discharge-electrode 26. This provides that the discharge electrodes are electrically isolated from each other when bolts 36 are inserted and nuts 37 tightened to hold the electrode assembly together. The ceramic tubes and washers are not used with bolt holes 41 through which bolts 36 are inserted to hold together ground discharge-electrode 24, ceramic-spacer extension 29, and extension block 32. This provides that the extension block is at ground potential as noted above. The insulating spacer strip here does not have an insulating function and is provide for matching the electrode separations as discussed above.

A preferred material for extension block 32 is aluminum. It is important however that if aluminum is used at least the front of raised portion 33 of the extension block, and preferably the entire block, should be plated with a relatively inert material that has a high melting temperature, such as nickel. This is because the front of the raised portion is exposed to stray intra-cavity laser radiation if the resonator is not precisely aligned. If the block is not nickel plated, native aluminum oxide ($Al_2O_3$) will form on the aluminum. Heating of the oxide by stray radiation can cause "flaking" of the aluminum native oxide coating due to differential thermal expansion between the native oxide and the host aluminum material. Such "flaking" can generate hot particles when heated by the laser radiation. These hot particles can cause damage to the reflective surface of a mirror assembly.

The present invention is described above in terms of a preferred embodiment. The invention is not limited, however, to the embodiment described and depicted. Rather, the invention is limited only by the claims appended hereto.

What is claimed is:

1. A gas discharge laser driven by radio frequency (RF) power, comprising:

first and second elongated planar discharge-electrodes arranged vertically spaced apart and parallel to each other, and electrically insulated from each other with the first electrode functioning as a live electrode and arranged to receive the RF power from a source thereof and the second electrode functioning as a ground electrode, with the discharge electrodes being spaced apart by first and second electrically insulating spacer strips having first and second opposite ends and arranged along opposite edges of the electrodes with inside edges thereof laterally spaced-apart by a first distance, the spacer strips having a height which determines the vertical spacing of the live and ground electrodes;

first and second mirrors forming a laser resonator extending longitudinally through the space between the discharge electrodes, such that when a discharge is created in a lasing gas between the discharge electrodes when the first electrode receives the RF power, laser radiation circulates in the laser resonator; and a planar extension block at each end of the first electrode, longitudinally spaced part from the first electrode, vertically spaced apart from the ground electrode and electrically connected to the second electrode, the extension block having two raised portions thereon having a height about equal to the height of the spacer strips and laterally spaced apart by a second distance less than the first distance, whereby erosion of the insulating spacer strips by the laser radiation is minimized.

2. The gas discharge laser of claim 1, wherein the first electrode is shorter than the second electrode and the combined length of the first electrode, the extension blocks and the longitudinal spacings of the extension blocks is about equal to the length of the second electrode.

3. The gas discharge laser of claim 1, wherein the first electrode and the second electrode are co-planar.

4. The gas discharge laser of claim 1, wherein facing edges of the raised portions of the extension block are chamfered at each end thereof for preventing stray resonances from being formed within the resonator.

5. The gas discharge laser of claim 1, wherein the longitudinal separation of the extension blocks and the first electrode is sufficient to prevent a gas discharge occurring between the first electrode and the extension block under operating conditions of the gas discharge laser.

6. The gas discharge laser of claim 1, wherein the spacer strips are strips of a ceramic material.

7. The gas discharge laser of claim 1, where the insulating strips extend longitudinally beyond the first electrode and determine the vertical separation of the extension block from the second electrode, whereby the first electrode and the extension block are coplanar.

8. The gas discharge laser of FIG. 7, wherein the spacer strips have a reduced width at each end thereof, configured to accommodate the raised portions of the extension block.

9. The gas discharge laser of claim 8, wherein the spacer strips are strips of a ceramic material.

10. A slab laser comprising:

a housing containing a laser gas;

a pair of elongated, rectangular, planar electrodes, positioned within the housing in spaced apart, face to face relationship, one of said electrodes operating as the hot electrode and the other as the ground electrode;

a pair of mirrors aligned with opposite ends of the electrodes and defining the laser resonator and wherein the length of the hot electrode is less than the length of the ground electrode and is positioned so that the opposite ends of the hot electrode are spaced farther away from the mirrors than the ends of the ground electrode; and a pair of metal extension blocks positioned between the respective opposite ends of the hot electrode and the associated mirror, each said extension block being spaced from the end of the hot electrode in the length direction and positioned in face to face relationship with the ground electrode, said extension blocks being connected to ground so that no laser discharge occurs between the ground electrode and the extension blocks.

11. A laser as recited in claim 10, wherein the spacing between the extension blocks and the ends of the hot electrode is greater than the spacing between the hot electrode and the ground electrode.

12. A laser as recited in claim 11, further including a pair of elongated dielectric spacers located between the electrodes along the side edges thereof and defining the spacing between the electrodes.

13. A laser as recited in claim 12, wherein each said extension block includes a pair of raised plateaus formed on the surface of the block facing the ground electrode and located on the opposed side edges thereof.

14. A laser as recited in claim 13, wherein the lateral spacing between the facing edges of opposed plateaus is less than the later spacing between the facing edges of the dielectric spacers.

* * * * *